(12) United States Patent
Chang

(10) Patent No.: US 8,094,018 B2
(45) Date of Patent: Jan. 10, 2012

(54) PICK-RESISTANT LOCK SYSTEM

(75) Inventor: Tzu-Wei Chang, Taipei County (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 316 days.

(21) Appl. No.: 12/367,548

(22) Filed: Feb. 8, 2009

(65) Prior Publication Data

US 2009/0223265 A1 Sep. 10, 2009

(30) Foreign Application Priority Data

Mar. 6, 2008 (CN) .......................... 2008 1 0026712

(51) Int. Cl.
*E05B 45/06* (2006.01)
(52) U.S. Cl. .................. 340/542; 70/432; 200/61.93
(58) Field of Classification Search .................. 340/540, 340/541, 542; 70/432–439; 92/5 L; 200/61.93
See application file for complete search history.

(56) References Cited

U.S. PATENT DOCUMENTS

| | | | | |
|---|---|---|---|---|
| 6,040,771 A * | 3/2000 | Kim | ........................... | 340/545.1 |
| 6,297,735 B1 * | 10/2001 | Abel | ............................. | 340/542 |
| 6,690,267 B2 * | 2/2004 | Linden et al. | ................. | 340/432 |
| 6,950,033 B1 * | 9/2005 | Guyre | ........................ | 340/687 |
| 6,950,267 B1 * | 9/2005 | Liu et al. | ......................... | 360/75 |
| 6,955,294 B1 * | 10/2005 | Seegar | ........................ | 235/380 |
| 6,965,294 B1 * | 11/2005 | Elliott et al. | ................... | 340/5.2 |
| 6,993,592 B2 * | 1/2006 | Krumm et al. | ................. | 709/236 |
| 7,034,238 B2 * | 4/2006 | Uleski et al. | .................. | 200/500 |
| 7,382,250 B2 * | 6/2008 | Marcelle et al. | ............. | 340/542 |
| 2005/0052277 A1* | 3/2005 | Rodriguez et al. | ........... | 340/5.72 |
| 2006/0288744 A1* | 12/2006 | Smith | .......................... | 70/38 B |
| 2007/0241859 A1* | 10/2007 | Bhat et al. | ..................... | 340/5.1 |

* cited by examiner

*Primary Examiner* — George Bugg
*Assistant Examiner* — Edny Labbees
(74) *Attorney, Agent, or Firm* — Li & Cai Intellectual Property (USA) Office

(57) ABSTRACT

A pick-resistant lock system includes a locking means. The locking means includes a displacement sensor for sensing displacement so as to generate a displacement signal, the displacement sensor comprising a micro electromechanical gyroscope, a second counterpart, a second alarm, and a second control unit for receiving the displacement signal so as to start the alarm. A key includes a control switch, a second counterpart corresponding to the second counterpart, a second alarm, and a second control unit for receiving the displacement signal transmitted from the locking means so as to start the second alarm.

20 Claims, 3 Drawing Sheets

PICK-RESISTANT LOCK SYSTEM

BACKGROUND OF THE INVENTION

1. Field of the Invention

The present invention provide to a pick-resistant lock system, and more particularly to a pick-resistant lock system for receiving displacement a signal so as to start the alarm.

2. Description of the Prior Art

A pick-resistant lock system is utilized for automobiles widely. The pick-resistant lock system is capable of locking a car door and a steering wheel. The car pick-resistant lock system has wise functions of auto alarm, auto-cutoff oil passage, and so on. The pick-resistant lock system usually includes a displacement sensor. When the car is destroyed or moved abnormally, the displacement sensor senses the displacement of the car and generates corresponding signals to start the above-mentioned functions.

A displacement measuring device can include an acceleration sensor such as a mercury switch, a metallic capacitance or an image recognition device. The displacement sensor also can include an inclination measuring device such as an optical sensor, a ball switch, and so on. For sensing a three-dimensional displacement, it needs at least one acceleration measuring device and at least one inclination measuring device or needs the plurality of acceleration measuring devices and the plurality of inclination measuring devices to operate cooperatively. It not only results in complex structure but in fixed installation with a single car body. Therefore, it needs to change the circuit of the car body causing difficulty of installation.

SUMMARY OF THE INVENTION

A pick-resistant lock system includes a locking means. The locking means including a displacement sensor for sensing displacement so as to generate a displacement signal, the displacement sensor comprising a micro electromechanical gyroscope, a first counterpart, a first alarm, and a first control unit for receiving the displacement signal so as to start the alarm. A key includes a control switch, a second counterpart corresponding to the first counterpart, a second alarm, and a second control unit for receiving the displacement signal transmitted from the locking means so as to start the second alarm.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
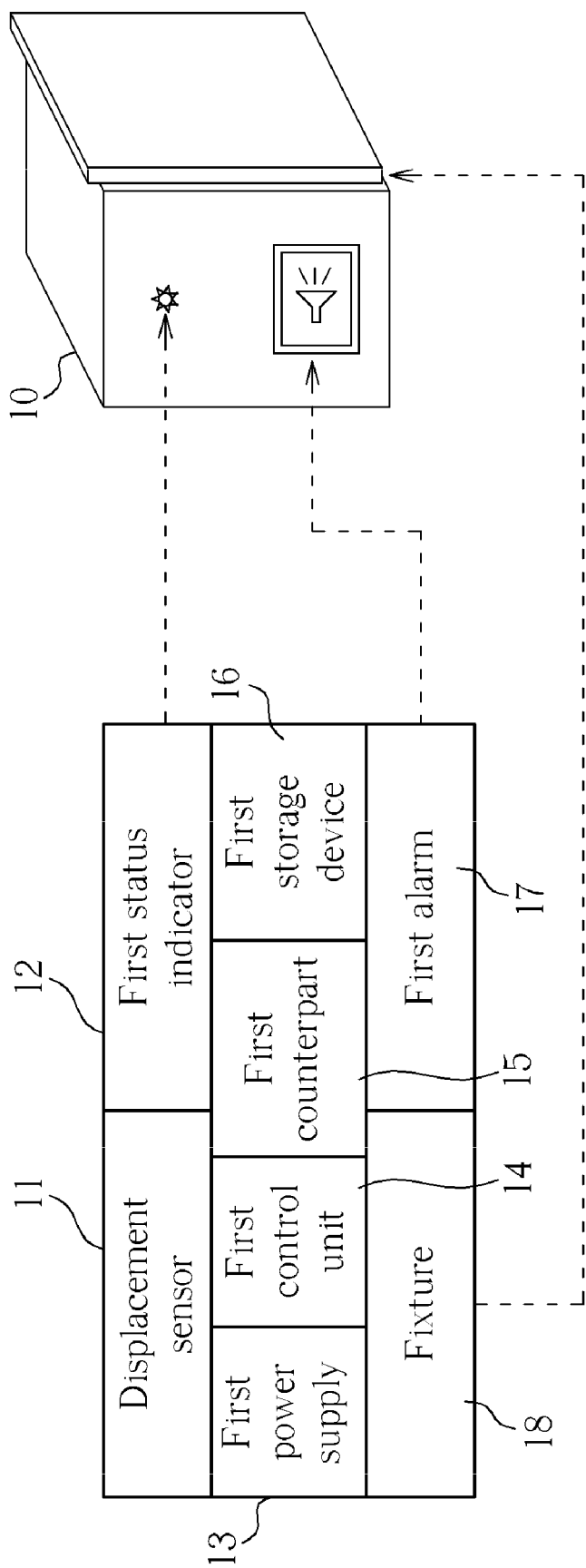
FIG. 1 is a schematic diagram of the pick-resistant lock system of the locking means functional module according to the embodiment of the present invention.
Figure 2:
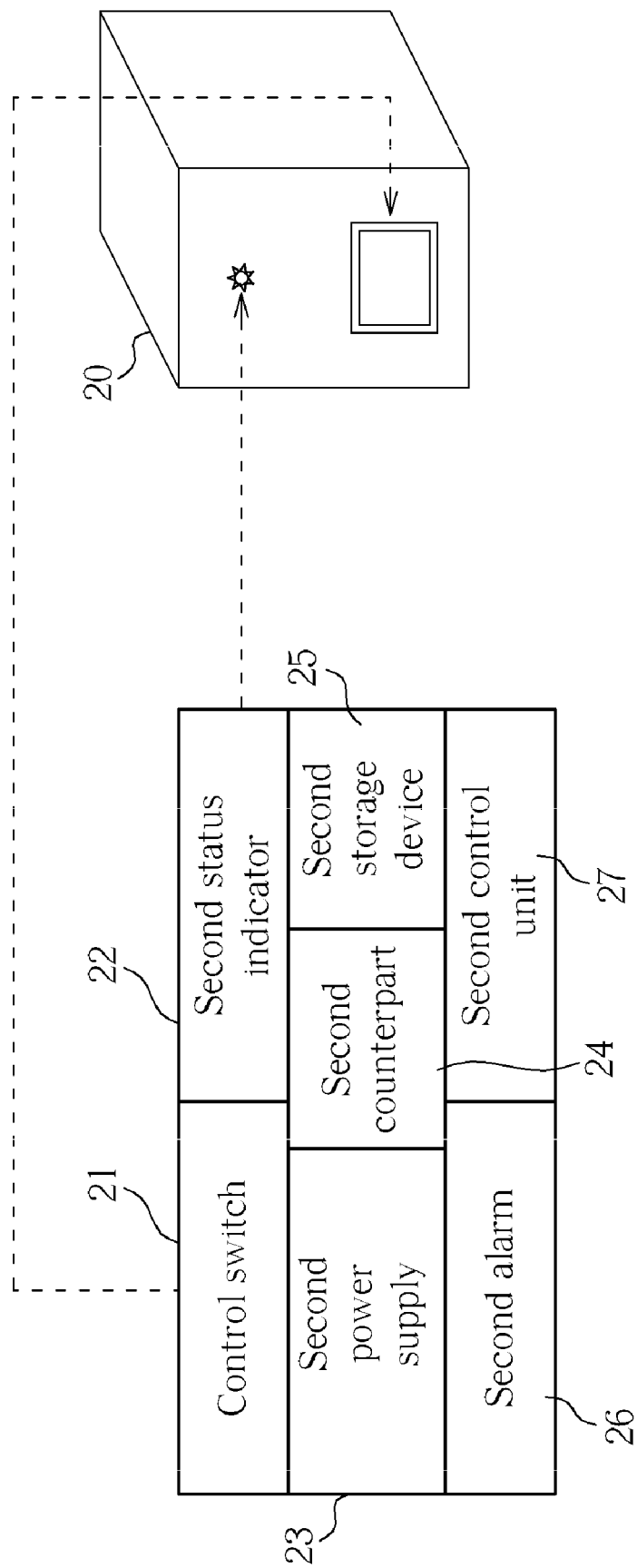
FIG. 2 is a schematic diagram of the pick-resistant lock system of the key functional module according to the embodiment of the present invention.

Please refer to FIG. 1 and FIG. 2. FIG. 1 is a functional block diagram of a locking means 10 functional module of a pick-resistant lock system according to a preferred embodiment of the present invention. FIG. 2 is a functional block diagram of a key 20 of the pick-resistant lock system according to the preferred embodiment of the present invention. As shown in FIG. 1, the locking means 10 includes a displacement sensor 11, a first status indicator 12, a first power supply 13, a first control unit 14, a first counterpart 15, a first storage device 16, a first alarm 17, and a fixture 18. The displacement sensor 11 can be a micro electromechanical gyroscope, which is composed with a small size chip. The micro electromechanical gyroscope can sense three-dimension displacement. That is, when the micro electromechanical gyroscope vibrates at three directions, it is capable of sensing the displacement change at the same time.

As shown in FIG. 2, the key 20 includes a control switch 21, a second status indicator 22, a second power supply 23, a second counterpart 14, a second storage device 25, a second alarm 26, and a second control unit 27.

The first status indicator 12 can be a light for indicating an on state (the light is on), an off state (the light is off), and a power shortage state (the light is flash) of the locking means 10. The first power supply 13 can be a battery for providing electrical power to the locking means 10. The first power supply 13 can include a power switch for controlling ON or OFF state of the locking means 10. When the locking means 10 does not need to operate, the power source can be switched off for saving the electrical power. The first counterpart 15 of the locking means 10 can conform to wireless communication technology, such as infrared, high frequency, and Bluetooth technology. The first storage device 16 can store encoding and decoding data corresponding to the locking means 10 and original slope angle of the micro electromechanical gyroscope corresponding to the original displacement signal of the micro electromechanical gyroscope.

The first control unit 14 can be a central processing unit (CPU) and includes software for operating and controlling a series of events including obtaining the displacement signal sensed by the micro electromechanical gyroscope, and comparing the displacement signal with the original displacement signal stored in the first storage device 16. If the micro electromechanical gyroscope senses the displacement change, the first control unit 14 transmits the displacement signal to the first alarm 17 of the locking means 10 for alarming. Simultaneously, the first control unit 14 transmits the displacement signal to a second alarm 26 of the key 20 for alarming. When the locking means 10 enters the on state, the off state, or the power shortage state, the first control unit 14 transmits corresponding signal to the first status indicator 12. The first alarm 17 can be a buzzer. When the first alarm 17 receives the alarming signal, the first alarm 17 can make noise for expelling the thief.

The fixture 18 can be a magnet, which is fixed on the locking means 10. When the user leaves their property, the user can attach the magnet on the locking means 10 on a metal part of the property and switches the locking means 10 to the on state. After the user releases the on state, the locking means 10 can be taken off conveniently from the property and used repeatedly. For example the pick-resistant lock system can be used for the car or for the bicycle. Therefore, the pick-resistant lock system has the characteristic of convenient assembly and application of various properties.

The fixture 18 also has other types. For example, the locking means 10 for car security utilization can be the magnet attached to the magnetized metal part inside the car, on the car, or under the car. The locking means 10 also can be a Velcro and attached to the cloth material inside the car, such as the chair or the car door. The locking means 10 also can be a twin adhesive and disposed at the any stationary position in the car. The locking means 10 also can be a snap and be combined with a buckle device in the car such as the car door knob or the steering wheel. Furthermore, the fixture 18 can combine the above-mentioned mechanism. For example, a magnet can be disposed on a side of the locking means 10 for attracting the metal part, and a Velcro can be disposed on another side of the locking means 10 for combining with the cloth material. In addition, the fixture 18 can be omitted, and the locking means is disposed with property directly.

In order to simultaneously protect a plurality of property, such as a car and a notebook computer positioned inside the car, a plurality of the locking means 10 can be utilized for pairing with the locking means 10. When each of the plurality of the property is moved, the first alarm 17 will generate alarming sound. The user can turn on or turn off the power supply of the locking means respectively.

The control switch 21 can control the on state or the off state of the locking means 10. The control switch 21 can be disposed on the position where the control switch 21 can not be achieved easily, and the control switch 21 can include the lock function of the keyboard to avoid switching the states unintentionally.

The second status indicator 22 can be a light for indicating an on state (the light is on), an off state (the light is off), and a power shortage state (the light is flash) of the locking means 10. The second power supply 23 can be a battery for providing electrical power to the key 20. The second power supply 23 can include a power switch for controlling ON or OFF state of the key 20. When the key 20 does not need to operate, the power source can be switched off for saving the electrical power. The second counterpart 24 corresponds to the first counterpart 15 of the locking means 10. The second counterpart 24 can conform to wireless communication technology, such as infrared, high frequency, and Bluetooth technology. The second storage device 25 can store encoding and decoding data corresponding to the locking means 10 and original slope angle of the micro electromechanical gyroscope corresponding to the original displacement signal of the micro electromechanical gyroscope.

The second control unit 27 can be a central processing unit (CPU) and includes software for operating and controlling a series of events including accepts the displacement signal by the locking means 10. Furthermore, the locking means 10 transmits the displacement signal to the second alarm 26 for alarming. The second storage device 25 stores encoding and decoding data of the locking means 10 and the key 20. The key 20 controls the locking means 10 for controlling ON or OFF state. When the key 20 enters the on state, the off state, or the power shortage state, the second control unit 27 transmits corresponding signal to the second status indicator 22.

The second alarm 26 can be a buzzer. When the displacement signal sensed by the micro electromechanical gyroscope, the second control unit 27 transmits the displacement signal to the first alarm 17 of the locking means 10 for alarming. Simultaneously, the second control unit 27 transmits the displacement signal to a second alarm 26 of the key 20 for alarming. The second alarm 26 can make noise for expelling the thief.

Figure 3:
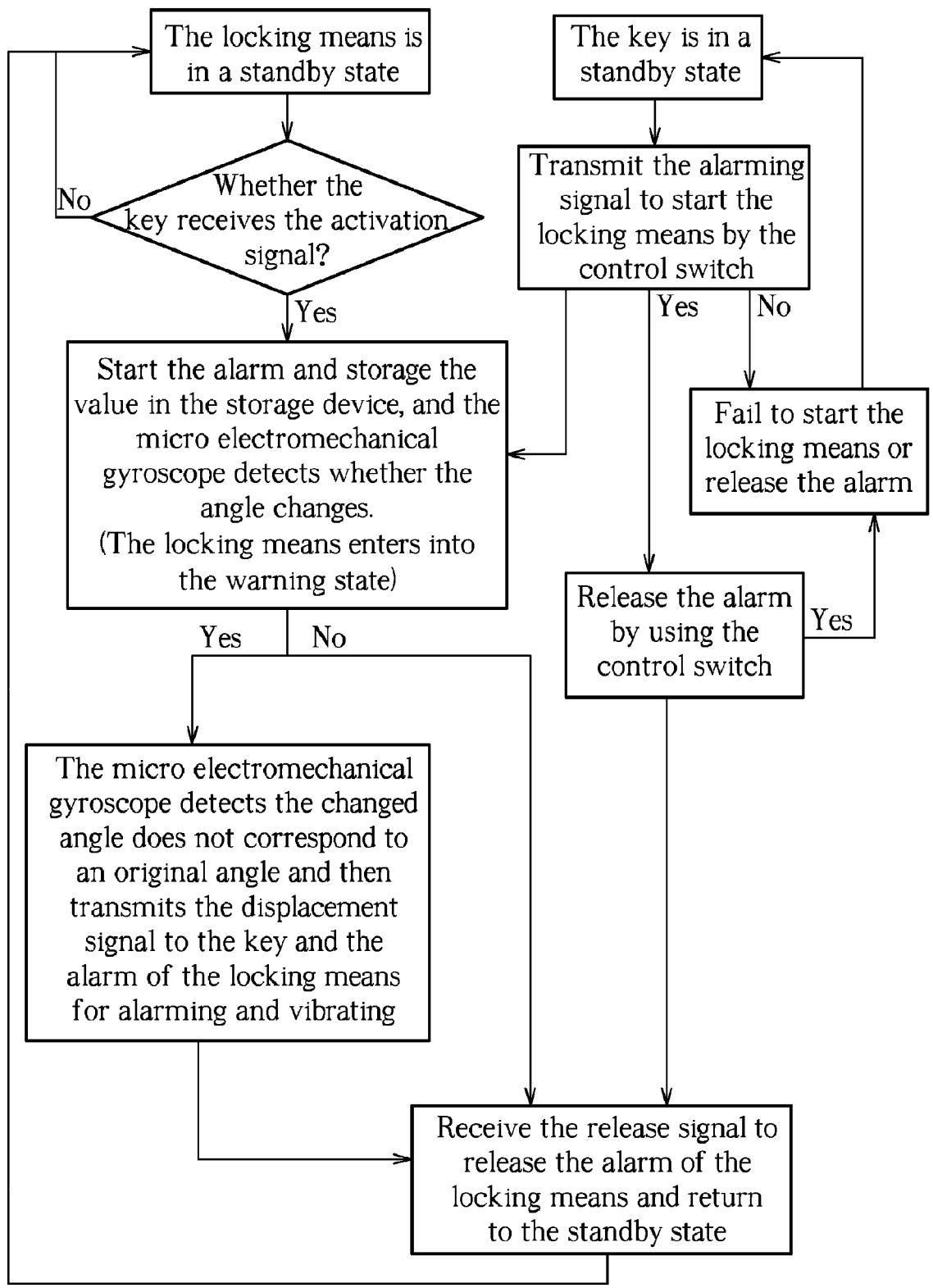
FIG. 3 is an application flow chart of the pick-resistant lock system according to the embodiment of the present invention.

Please refer to FIG. 3, FIG. 3 is a flowchart of utilization of the pick-resistant lock system according to the preferred embodiment of the present invention. First, the locking means 10 and the key 20 have been matched before leaving the factory or starting the power switches of the locking means 10 and the keys. After the key 20 transmits the activation signal to the locking means 10 via the control switch 21, the security of the locking means 10 is turned on. The locking means 10 stores the original displacement value in the first storage device 16 at the same time. The micro electromechanical gyroscope senses whether an angle thereof is changed. If the micro electromechanical gyroscope senses whether the angle thereof is changed, the micro electromechanical gyroscope will transmit the displacement signal to the first alarm 17 of the locking means 10 and the second alarm 26 of the key 20 so that the locking means 10 and the key 20 start the alarm and generate the alarming sounds or the vibrational reminder. At last, the user can use the control switch 21 of the key 20 to release the on state and alarm of the locking means 10 and return to the standby state. If the micro electromechanical gyroscope does not sense that the angle thereof is changed, the locking means 10 waits for receiving the release signal of the key 20 to release the on state of the locking means 10 and return to the standby state. If the key 20 fails to start the locking means 10 or the alarm is released by user, and the locking means 10 returns to the standby state, too.

The locking means 10 is the plurality of device, which means the plurality of locking means 10 operate with one key 20. The flowchart of the pick-resistant lock system is as follows: First, every locking means 10 and every key 20 have been matched before leaving the factory or starting the power switches of every locking means 10 and every key. After the key 20 transmits the activation signal to every locking means 10 via the control switch 21, the security of every locking means 10 is turned on. Every locking means 10 stores the original displacement value in the first storage device 16 at the same time. The micro electromechanical gyroscope senses whether an angle thereof is changed. If the micro electromechanical gyroscope senses whether the angle thereof is changed, the micro electromechanical gyroscope will transmit the displacement signal to the first alarm 17 of the locking means 10 and the second alarm 26 of the key 20 so that the locking means 10 and the key 20 start the alarm and generate the alarming sounds or the vibrational reminder. At last, the user can use the control switch 21 of the key 20 to release the on state and alarm of the locking means 10 and return to the standby state. If the micro electromechanical gyroscope does not sense that the angle thereof is changed, the locking means 10 waits for receiving the release signal of the key 20 to release the on state of the locking means 10 and return to the standby state. Therefore an angle thereof is changed with one locking means 10, and only one locking means 10 start the alarm.

The pick-resistant lock system has simple structure, small volume, and convenient to carry character. Therefore, the locking means and the key can install in any property for protecting, such as a cars, a computers, and a travel package.

Those skilled in the art will readily observe that numerous modifications and alterations of the device and method may be made while retaining the teachings of the invention.

What is claimed is:

1. A pick-resistant lock system comprising:
   a locking means comprising:
      a displacement sensor for sensing a displacement of an object so as to generate a displacement signal, the displacement sensor comprising:
         a micro electromechanical gyroscope, which generates the displacement signal when an angular velocity of the micro electromechanical gyroscope is larger than a predetermined threshold;
      a first counterpart;
      a first alarm;
      a first storage device storing an original displacement signal; and a first control unit receiving the displacement signal, starting the first alarm after comparing the displacement signal with the original displacement signal, and meanwhile transmitting the displacement signal to a second control unit; and a key comprising;

a control switch;

a second counterpart corresponding to the first counterpart for matching the key with the locking means;

a second alarm; and the second control unit for receiving the displacement signal transmitted from the locking means so as to start the second alarm;

wherein the locking means further comprises a first status indicator for indicating an actuating state, an off state, and a power shortage state of the locking means.

2. The pick-resistant lock system of claim 1 wherein the first-counterpart and the second counterpart are counterparts wireless communication technology.

3. The pick-resistant lock system of claim 2 wherein the wireless communication technology is infrared technology.

4. The pick-resistant lock system of claim 2 wherein the wireless communication technology is high frequency technology.

5. The pick-resistant lock system of claim 2 wherein the wireless communication technology is blue tooth technology.

6. The pick-resistant lock system of claim 1 wherein the control switch controls the locking means to turn on or turn off.

7. The pick-resistant lock system of claim 1 wherein the first alarm is a buzzer.

8. The pick-resistant lock system of claim 1 wherein the locking means further comprises a fixture being a magnet, a snap, a twin adhesive, or a Velcro.

9. The pick-resistant lock system of claim 1 wherein the first status indicator is a light emitting diode (LED).

10. The pick-resistant lock system of claim 1 wherein the locking means further comprises a first power supply.

11. The pick-resistant lock system of claim 10 wherein the first power supply is a battery.

12. The pick-resistant lock system of claim 10 wherein the first power supply comprises a first power switch for controlling ON or OFF state of the locking means.

13. The pick-resistant lock system of claim 1 wherein the first storage device further stores encoding and decoding data of the first counterpart and the second counterpart.

14. The pick-resistant lock system of claim 1 wherein the key further comprises a second status indicator for indicating an actuating state, an off state, an a power shortage state of the key.

15. The pick-resistant lock system of claim 14 wherein the second status indicator is a light emitting diode (LED).

16. The pick-resistant lock system of claim 1 wherein the key further comprises a second power supply.

17. The pick-resistant lock system of claim 16 wherein the second power supply is a battery.

18. The pick-resistant lock system of claim 16 wherein the second power supply comprises a second power switch for controlling ON or OFF state of the key.

19. The pick-resistant lock system of claim 1 wherein the key comprises a second storage device for storing encoding and decoding data of the first counterpart and the second counterpart.

20. The pick-resistant lock system of claim 1 wherein the second alarm is a buzzer or a vibrator.

\* \* \* \* \*